(No Model.) 2 Sheets—Sheet 1.

F. FOWLER.
Velocipede.

No. 240,990. Patented May 3, 1881.

Witnesses:
Floyd Norris
Philip F. Larner

Inventor:
Francis Fowler
By Johnson & Johnson
Attys (No Model.) 2 Sheets—Sheet 2.

F. FOWLER.
Velocipede.

No. 240,990. Patented May 3, 1881.

Witnesses:
Floyd Norris
Philip F. Larner

Inventor:
Francis Fowler
by Johnson and Johnson
Attys

UNITED STATES PATENT OFFICE.

FRANCIS FOWLER, OF NEW HAVEN, CONNECTICUT.

VELOCIPEDE.

SPECIFICATION forming part of Letters Patent No. 240,990, dated May 3, 1881.

Application filed November 9, 1880. (No model.)

*To all whom it may concern:*

Be it known that I, FRANCIS FOWLER, a citizen of the United States, residing at New Haven, in the county of New Haven and State of Connecticut, have invented new and useful Improvements in Freight-Velocipedes, of which the following is a specification.

My invention is directed to the production of a freight-velocipede, and especially for delivering goods and packages in city and country traffic, and is designed to take the place of the horse and wagon and hand-cart to a greater or less extent for such purposes.

In carrying out this object I use with the high curved or sloping reach or bicycle "backbone" a low-down cart, forming, in fact, a rigid rear or terminal attachment of said backbone, mounted by springs upon wheels, in connection with high front driving and steering wheels mounted upon a crank-axle driven by the action of the rider's feet upon oppositely-arranged cranks provided with foot-rests. In this construction the cart is not thrown sidewise by the sudden turning of the velocipede under high speed, which is an important advantage in preventing damage to the goods and twisting strain upon the reach-connections. The low-down position of the cart renders it easy to be filled with goods and to deliver them therefrom as the driver may desire.

The cart or body may be of any suitable closed or open structure, according as it may be required for any special use.

Figure 1:
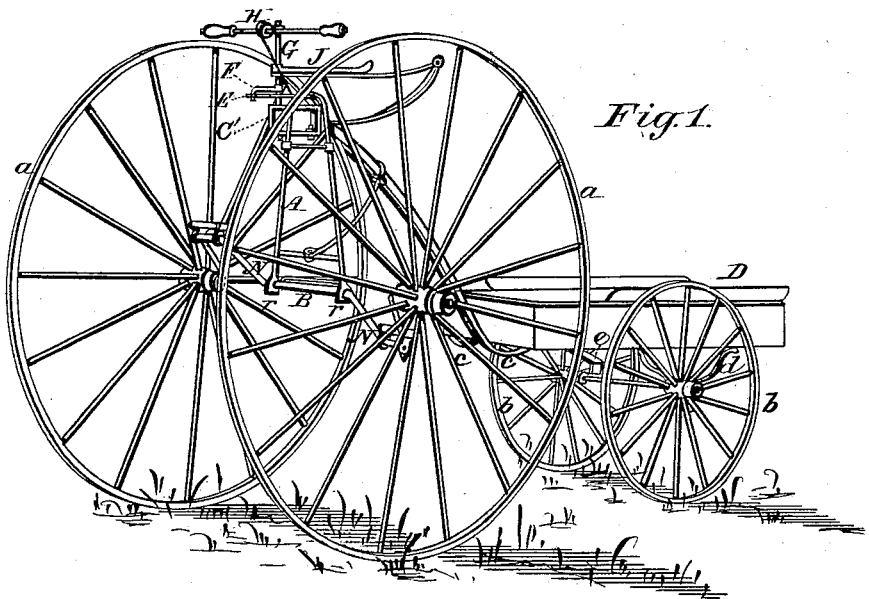
Figure 3:
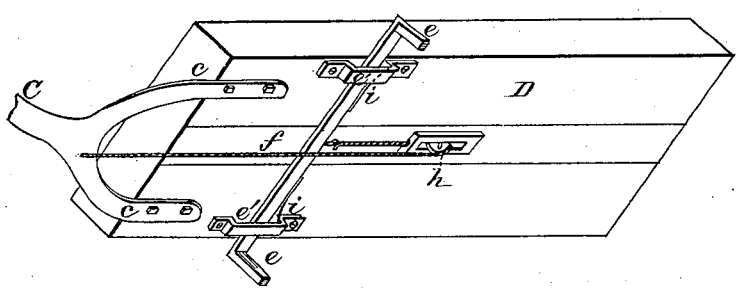
Figure 4:
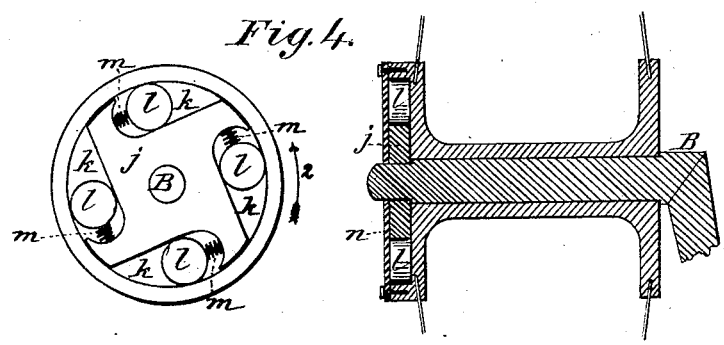
Figure 2:
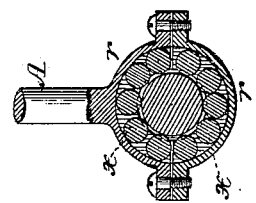
Figure 2:
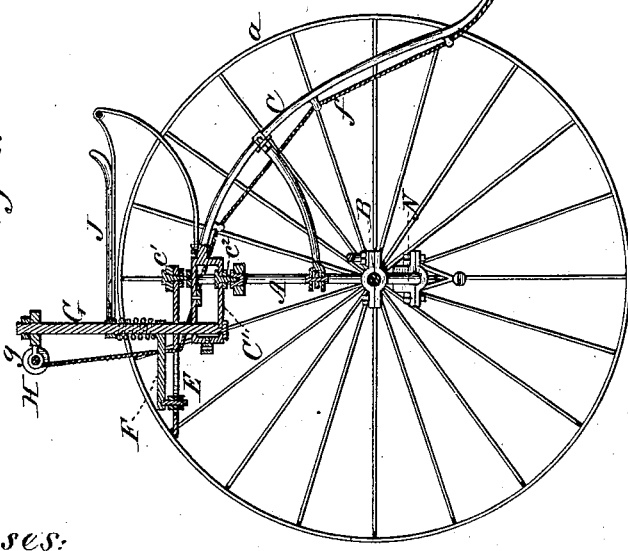

Referring to the accompanying drawings, Figure 1 represents a view, in perspective, of my freight-velocipede; Fig. 2, a vertical central section of the same; Fig. 3, a bottom view of the cart and its reach and brake attachments; Fig. 4, face and sectional views of the clutch device of the driven wheels, and Fig. 5 three views of details of the anti-friction boxes of the reach-supporting fork or yoke.

The driver part of my freight-velocipede consists of high front wheels, $a\ a$, mounted upon an axle, B, driven by the action of the rider's feet upon oppositely-arranged cranks N N, provided with foot-rests, and in which said wheels are also adapted as the steering-wheels, and controlled as such by the rider, seated upon the elevated part of the reach or backbone C, by means of a yoke-frame or "fork," A, mounted upon the axle, between the foot-rests, and to which the reach is pivoted. Such driving part may be of any suitable construction as to its adaptation for both driving and steering; but I prefer that shown in a patent granted to me May 11, 1880, No. 227,511, in which a free lever action is obtained upon the yoke-frame or fork and upon the pivoted reach in front of said fork, to facilitate the steering of the driven or traction wheels, and in which the wheel-hubs are provided with clutch-connections with the crank-shaft, to allow the wheels to revolve independently of the axle in making turns. The details of these parts, except the clutch-connections, it is deemed unnecessary to embrace herein, either as to their illustration or description, as they are, for the purposes of my present improvement, specifically presented in my said patent.

The curved reach or backbone is pivoted to the upper part of the yoke-frame, and has a rear or terminal attachment forming a car or cart, D, which may be of any suitable size, form, and construction for the storage and safe keeping of goods, or for other use, and protected against the weather. It forms a horizontal prolongation of the lower curved end of the backbone, being permanently attached thereto by the arms $c\ c$ of the backbone, so that the cart can have no vertical or sidewise movement independent of the reach or backbone, and in this particular is a fixed and braced part thereof.

The cart has preferably two wheels, $b\ b$, upon which the body is mounted by springs $d\ d$, of any suitable form and construction for proper spring action. These wheels are comparatively small, giving a low-down cart for convenience in placing in and removing goods therefrom.

The cart is formed and placed so as not to interfere with the proper guiding action of the front wheels, and it is important that the velocipede can be turned short under high speed without throwing the cart to one side, as the small wheels merely support and carry the cart.

The reach or backbone extends through the upper part of the yoke-frame, which is mounted by suitable boxes upon the axle between the foot-cranks. The end of the reach terminates in an open lever part, C′, in front of the pivot-bolts $c'\ c^2$, which connect the reach with said yoke-frame. This lever part of the reach is connected with the steering-bar H by means of a lever-arm, E, fixed to the yoke-frame, and a crank-lever, F, upon the post G of the steering-bar, and it is the united action of these lever parts which renders the steering of the driven wheels comparatively easy and effective, and relieves the cart from sudden side thrusts.

A brake may be arranged to act upon the front wheels; but in the drawings a brake-bar, $e$, is shown as secured in guides $e'$ to the under side of the cart and applied to its wheels by a cord, $f$, attached to a pulley, $g$, on the steering-bar, and passing over a pulley, $h$, on the under side of the cart. The brake-bar is held out of action by springs $i$, Fig. 3.

J is the rider's seat, which is made adjustable to suit riders having different lengths of legs and the sweep of the crank foot-rests, as in my said patent.

The driving of the driven wheels is effected by hub clutch-connections with the crank-axle, upon which the wheels are fitted to turn loosely. This clutch device consists of a plate, $j$, fixed upon the axle, turning with it, and provided with two or more circumferential recesses, $k$, within which are fitted chucks $l$, in a manner to bear against interior circular walls of the hub, formed by an annular chamber in the hub, within which the axle-plate $j$ and the chucks are arranged, and operate to lock the axle and wheels for driving action, as indicated by the arrow 2 in Fig. 4, and adapted to release such lock, to allow the wheels to revolve in the same direction faster and independently of the axle in making turns. In this action the chucks act as controllable wedges between the axle and the wheels, and they are arranged in equidistant positions with reference to each other and to the axle, when four are used, at quadrant-points, as shown. The recesses $k$ form corresponding arms on the plate $j$, which, however, do not touch the wall of the hub-chamber, and the chucks are supported upon the straight sides of these arms within the recesses, which have thereby a wedge form, and within which the chucks have a limited play, and within which they are maintained in the relation to each other described by springs $m$, so as to cause them to act at once and each to take its part in forming the lock, the action of the springs causing the chucks to be constantly forced toward the ends of the arms, so that when driving they will bite alike upon the hub-walls, and in turning the velocipede they will release such bite in the wheel traveling in the outer curve, as provided for by the ratchet-connections in my said patent. I prefer to make the chucks of cylindrical form, as shown, for giving a good hold both upon the axle-plate and the wheel-hub.

A cap, $n$, forms a cover for the hub-chamber; and it is obvious that such clutch device may be arranged within either end of the hub, which are enlarged and chambered, as shown, or of any construction adapted for the working of the chuck-clutch. This construction has the advantages of being free from noise in closing the clutch parts and creating little friction in the independent action of the wheels. The spokes are screwed into the hub ends, which are made sufficiently thick for that purpose.

Figure 5:
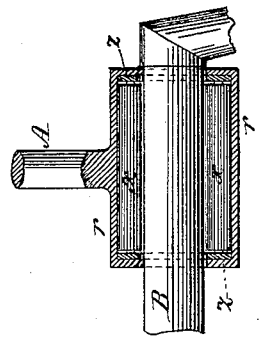

The bearings of the yoke-frame or fork are formed in half-boxes $r$ $r$, with bearing-rolls $x$, mounted in half-rings $z$, corresponding with the half-boxes, to give an easy running of the crank-axle, as shown in detail in Fig. 5. These half-rings fit within and against the ends of the boxes, and they are fitted over the axle with the half-boxes, and form a hollow cylinder of rolls as a bearing for the axle, and which revolves with it. The half-boxes are provided with flanges, by which they are bolted together, and by which the half-rings are properly joined and secured.

The wheels are provided with rubber tires, the front wheels being from four to seven feet in diameter and the rear wheels sufficient to carry the cart a suitable distance above the ground.

The driving parts and the backbone are preferably made of steel, as light as possible with a due regard to durability.

A driving clutch device of cylindrical chucks operating within cam-shaped recesses in plates fixed upon the axle, and adapted to lock the axle and wheels for driving action, is not claimed herein as new; but in such clutch device it is important to render the locking action certain and to prevent its slipping, and it is in this particular I have improved such device by the combination, with the chucks, of springs adapted to press upon and to maintain them always at the points in said recesses to make the lock and prevent the chucks from rolling to make such lock, except against the pressure of the springs, and to allow them to release such lock against such pressure.

I claim—

1. A freight-velocipede consisting of a high front driving and steering part, and a backbone provided with a low-down car or cart, and forming a fixed part thereof, substantially as and for the purpose herein set forth.

2. The combination, in a velocipede, of the driving-wheels $a$ $a$, mounted loosely upon the crank-axle B, driven by the action of the rider's feet upon oppositely-arranged cranks, the plates $j$ $k$, fixed upon the ends of said axle and having cam-shaped recesses and the chucks $l$, with the springs $m$, arranged in said cam-shaped recesses and pressing against said chucks, whereby they are maintained in positions within said recesses to lock the wheels, to prevent the slipping of said chucks, and to allow them to release such lock against the action of the springs, substantially as described.

In testimony whereof I have hereunto set my hand in the presence of two subscribing witnesses.

FRANCIS FOWLER.

Witnesses:
 AUSTIN B. FULLER,
 GEORGE A. ISBELL.